(12) United States Patent
Liu et al.

(10) Patent No.: US 11,592,704 B2
(45) Date of Patent: Feb. 28, 2023

(54) DIMMING PANEL, CONTROL METHOD THEREOF, AND DISPLAY DEVICE

(71) Applicants: Beijing BOE Display Technology Co., Ltd., Beijing (CN); BOE Technology Group Co., Ltd., Beijing (CN)

(72) Inventors: Bingyang Liu, Beijing (CN); Dongchuan Chen, Beijing (CN); Xueqiang Qian, Beijing (CN); Kaixuan Wang, Beijing (CN); Xinli Ma, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 16/959,060

(22) PCT Filed: Dec. 24, 2019

(86) PCT No.: PCT/CN2019/128007
§ 371 (c)(1),
(2) Date: Jun. 29, 2020

(87) PCT Pub. No.: WO2020/181877
PCT Pub. Date: Sep. 17, 2020

(65) Prior Publication Data
US 2021/0215972 A1 Jul. 15, 2021

(30) Foreign Application Priority Data
Mar. 12, 2019 (CN) .......................... 201910184172.1

(51) Int. Cl.
*G02F 1/1343* (2006.01)
*G02F 1/1333* (2006.01)
(Continued)

(52) U.S. Cl.
CPC .. *G02F 1/133601* (2021.01); *G02F 1/133357* (2021.01); *G02F 1/133504* (2013.01);
(Continued)

(58) Field of Classification Search
CPC ............. G02F 1/1333; G02F 1/133345; G02F 1/1335; G02F 1/133501; G02F 1/133504;
(Continued)

(56) References Cited

U.S. PATENT DOCUMENTS 5,872,609 A * 2/1999 Hiji ..................... G02F 1/13342
349/86
2016/0085120 A1 3/2016 Xu
(Continued)

FOREIGN PATENT DOCUMENTS

CN 104298042 A 1/2015
CN 106405950 A 2/2017
(Continued)

OTHER PUBLICATIONS

International search report of PCT application No. PCT/CN2019/128007 dated Mar. 23, 2020.
(Continued)

*Primary Examiner* — Thoi V Duong
(74) *Attorney, Agent, or Firm* — Fay Sharpe LLP (57) ABSTRACT

A dimming panel includes: a transparent base substrate and a plurality of dimming cells disposed on the transparent base substrate; each of the plurality of dimming cells comprises a refractive structure and an electric field structure disposed outside the refractive structure, the refractive structure comprises at least two film layers stacked, a refractive index difference between any two adjacent film layers in the at least two film layers is variable under an action of an electric field applied by the electric field structure.

16 Claims, 6 Drawing Sheets

(51) Int. Cl.
*G02F 1/1335* (2006.01)
*G02F 1/1368* (2006.01)
*G02F 1/13357* (2006.01)

(52) U.S. Cl.
CPC ...... *G02F 1/134309* (2013.01); *G02F 1/1368* (2013.01); *G02F 1/133621* (2013.01)

(58) Field of Classification Search
CPC ............. G02F 1/133514; G02F 1/1343; G02F 1/134309; G02F 2203/48; G02F 1/133357; G02F 1/1368; G02F 1/1336; G02F 1/133601; G02F 1/133606; G02F 1/133607; G02F 1/19; G02F 1/133621
See application file for complete search history.

(56) References Cited

U.S. PATENT DOCUMENTS

| | | |
|---|---|---|
| 2019/0011764 A1 | 1/2019 | Liang |
| 2019/0013362 A1 | 1/2019 | Qi et al. |
| 2019/0187530 A1 | 6/2019 | Liu et al. |
| 2019/0250437 A1 | 8/2019 | Guo et al. |

FOREIGN PATENT DOCUMENTS

| | | | |
|---|---|---|---|
| CN | 107102490 A | | 8/2017 |
| CN | 107132697 A | | 9/2017 |
| CN | 107255877 A | | 10/2017 |
| CN | 107817637 A | | 3/2018 |
| CN | 108258008 A | | 7/2018 |
| CN | 108873405 A | | 11/2018 |
| CN | 108919546 A | | 11/2018 |
| CN | 109696776 A | | 4/2019 |
| JP | 3090077 | * | 7/2000 |
| JP | 2009229903 A | | 10/2009 |
| KR | 20080091553 A | | 10/2008 |
| WO | WO2012164405 A2 | | 12/2012 |

OTHER PUBLICATIONS

First office action of Chinese application No. 201910184172.1 dated Mar. 30, 2020.

* cited by examiner

DIMMING PANEL, CONTROL METHOD THEREOF, AND DISPLAY DEVICE

This application is a 371 of PCT Application No. PCT/CN2019/128007, filed on Dec. 24, 2019, which claims priority to Chinese Patent Application No. 201910184172.1, filed on Mar. 12, 2019 and entitled "DIMMING PANEL, CONTROL METHOD THEREOF, AND DISPLAY DEVICE", the entire contents of which are incorporated herein by reference.

TECHNICAL FIELD

This application relates to the field of display technologies, in particular relates to a dimming panel, a control method thereof, and a display device.

BACKGROUND

The display device usually includes a liquid crystal display panel and a backlight module that provides a light source for the liquid crystal display panel.

The liquid crystal display panel includes a plurality of light-transmitting areas. The backlight module includes a plurality of light-emitting diodes corresponding to the plurality of light-transmitting areas respectively. When it is necessary to adjust the brightness of the light-transmitting area in the liquid crystal display panel, the light intensity of the light-emitting diode corresponding to the light-transmitting area can be adjusted, so as to adjust the intensity of light transmitted through the light-transmitting area to realize the dimming function of the display device.

SUMMARY

The present disclosure provides a dimming panel, a control method thereof, and a display device. The technical solutions are as follows:

In one aspect, a dimming panel is provided. The dimming panel includes a transparent base substrate and a plurality of dimming cells disposed on the transparent base substrate, wherein each of the dimming cells includes a refractive structure and an electric field structure disposed outside the refractive structure, the refractive structure includes at least two film layers stacked, and a refractive index difference between any two adjacent film layers in the at least two film layers is variable under an action of an electric field applied by the electric field structure.

Optionally, the refractive index difference between any two adjacent film layers is positively correlated with an intensity of the electric field applied by the electric field structure.

Optionally, the plurality of dimming cells include at least one dimming cell group, each dimming cell group includes at least one of the dimming cells, and the at least one dimming cell group corresponds to at least one colored light respectively; and in the dimming cell of any dimming cell group of the at least one dimming cell group, the refractive index difference between any two adjacent film layers in the refractive structure with respect to the colored light corresponding to the any dimming cell group is variable under the action of the electric field applied by the electric field structure.

Optionally, the plurality of dimming cells include three dimming cell groups, and the three dimming cell groups include a first dimming cell group corresponding to first colored light, a second dimming cell group corresponding to second colored light, and a third dimming cell group corresponding to third colored light.

Optionally, the transparent base substrate is provided with a plurality of pixel areas, each of the pixel areas including at least one dimming cell in the first dimming cell group, at least one dimming cell in the second dimming cell group, and at least one dimming cell in the third dimming cell group.

Optionally, at least one film layer of any two adjacent film layers in the refractive structure includes an electro-optic effect material.

Optionally, the electro-optic effect material includes at least one of dihydrogen phosphate, button acid, potassium dihydrogen phosphate, gallium arsenide, graphene, liquid crystal, and liquid crystal polymer.

Optionally, the electric field structure includes a first electrode and a second electrode, and the first electrode and the second electrode are disposed on the same side of the refractive structure.

Optionally, the first electrode and the second electrode are disposed on the same layer.

Optionally, the first electrode and the second electrode are disposed on different layers.

Optionally, the electric field structure includes a first electrode and a second electrode, and the first electrode and the second electrode are disposed on two sides of the refractive structure.

Optionally, the refractive index difference between any two adjacent film layers is negatively correlated with the intensity of the electric field applied by the electric field structure.

Optionally, the refractive structure includes at least four film layers stacked.

Optionally, the plurality of dimming cells include at least one dimming cell group, each dimming cell group includes at least one of the dimming cells, and the at least one dimming cell group corresponds to at least one colored light respectively;

in the dimming cell of any dimming cell group of the at least one dimming cell group, the refractive index difference between any two adjacent film layers in the refractive structure with respect to the colored light corresponding to the any dimming cell group is variable under the action of the electric field applied by the electric field structure;

The plurality of dimming cells include three dimming cell groups, and the three dimming cell groups include a red dimming cell group corresponding to red light, a green dimming cell group corresponding to green light, and a blue light dimming cell group corresponding to blue light.

The refractive structure includes two film layers, and at least one of the two film layers includes an electro-optic effect material.

In another aspect, a display device is provided. The display device includes a backlight module and a aforesaid dimming panel, wherein the dimming panel is disposed on a light-emitting side of the backlight module, and the dimming panel includes a transparent base substrate and a plurality of dimming cells disposed on the transparent base substrate; and each of the dimming cells includes a refractive structure and an electric field structure disposed outside the refractive structure, the refractive structure includes at least two film layers stacked, and a refractive index difference between any two adjacent film layers in the at least two film layers is variable under the action of an electric field applied by the electric field structure.

Optionally, the display device further includes a color filter substrate disposed on a side, distal from the backlight module, of the dimming panel.

Optionally, the color filter substrate includes a plurality of color resist blocks, the plurality of color resist blocks correspond to the plurality of dimming cells respectively, and an orthographic projection of each of the color resist blocks on the transparent base substrate is disposed within an orthographic projection of the corresponding dimming cell on the transparent base substrate.

Optionally, the plurality of dimming cells include at least one dimming cell group, each dimming cell group includes at least one of the dimming cells, and the at least one dimming cell group corresponds to at least one colored light respectively;

in a dimming cell of any of the at least one dimming cell group, the refractive index difference between any two adjacent film layers in the refractive structure with respect to the colored light corresponding to the any dimming cell group is variable under the action of the electric field applied by the electric field structure; and the colored light corresponding to each dimming cell group is transmittable through the color resist block corresponding to the dimming cell in each dimming cell group.

Optionally, the display device further includes a liquid crystal display panel, a first polarization plate, and a second polarization plate, wherein the liquid crystal display panel is disposed between the first polarization plate and the second polarization plate.

Optionally, the plurality of dimming cells include at least one dimming cell group, each dimming cell group includes at least one of the dimming cells, and the at least one dimming cell group corresponds to at least one colored light respectively; and in the dimming cell of any dimming cell group of the at least one dimming cell group, the refractive index difference between any two adjacent film layers in the refractive structure with respect to the colored light corresponding to the any dimming cell group is variable under the action of the electric field applied by the electric field structure; and the display device further includes a color filter substrate, wherein the color filter substrate is disposed on a side, distal from the backlight module, of the dimming panel;

the color filter substrate includes a plurality of color resist blocks, the plurality of color resist blocks corresponds to the plurality of dimming cells respectively, and an orthographic projection of each of the color resist blocks on the transparent base substrate is disposed within an orthographic projection of the corresponding dimming cell on the transparent base substrate; and the colored light corresponding to each dimming cell group is transmittable through the color resist block corresponding to the dimming cell in each dimming cell group; and the display device further includes a liquid crystal display panel, a first polarization plate, and a second polarization plate, wherein the liquid crystal display panel is disposed between the first polarization plate and the second polarization plate.

In another aspect, a control method of a dimming panel is provided. The control method is applied to controlling the aforesaid dimming panel, wherein the dimming panel includes a transparent base substrate and a plurality of dimming cells disposed on the transparent base substrate; each of the plurality of dimming cells includes a refractive structure and an electric field structure disposed outside the refractive structure, the refractive structure includes at least two film layers stacked, a refractive index difference between any two adjacent film layers in the at least two film layers is variable under the action of an electric field applied by the electric field structure, and the method includes:

acquiring a control signal; and controlling the electric field structure of at least one of the plurality of dimming cells to apply the electric field to the refractive structure according to the control signal, such that the refractive index difference between any two adjacent film layers in the refractive structure changes.

It is to be understood that both the foregoing general description and the following detailed description are exemplary only and are not intended to limit the present disclosure.

The accompanying drawings, which are incorporated in and constitute a part of this specification, illustrate embodiments consistent with the present disclosure, and together with the description, serve to explain the principles of the present disclosure.

DETAILED DESCRIPTION

The present disclosure is described below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

In the related art, the intensity of light transmitted through the light-transmitting area corresponding to the light-emitting diode can be adjusted by adjusting the light intensity of the light-emitting diode in the backlight module of the display device to realize the dimming function of the display device.

A dimming panel according to an embodiment of the present application can realize the dimming function without a polarizer. When the dimming panel forms a display device with a liquid crystal display panel and a backlight module, it is also unnecessary to provide polarizers on two sides of the dimming panel, which reduces the thickness of the display device.

Figure 1:
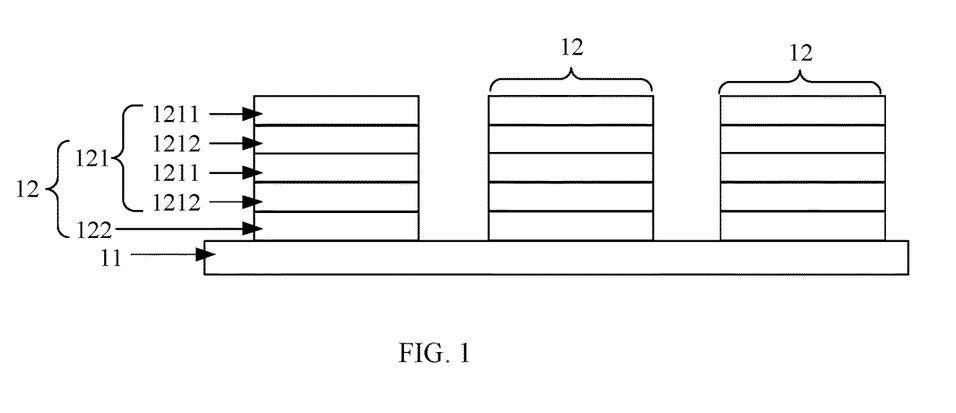
FIG. 1 is a schematic structural diagram of a dimming panel according to an embodiment of the present application.

FIG. 1 is a schematic structural diagram of a dimming panel according to an embodiment of the present application. The dimming panel 10 may include a transparent base substrate 11 and a plurality of dimming cells 12 disposed on the transparent base substrate 11. Each of the plurality of dimming cells 12 includes a refractive structure 121 and an electric field structure 122 disposed outside the refractive structure 121. The refractive structure 121 includes at least two film layers stacked. In each dimming cell 12, a refractive index difference between any two adjacent film layers in the refractive structure 121 is variable under the action of an electric field applied by the electric field structure 122.

FIG. 1 takes the dimming panel 10 including only three dimming cells 12 as an example. Optionally, the dimming panel 10 may also include other number (such as hundreds or thousands) of dimming cells 12, which is not limited in the embodiment of the present application.

The transmittance of the refractive structure 121 is negatively correlated with the refractive index difference between any two adjacent film layers in the refractive structure 121. That is, when the refractive index difference between any two adjacent film layers increases, the transmittance of the refractive structure decreases accordingly; and when the refractive index difference between any two adjacent film layers decreases, the transmittance of the refractive structure increases accordingly.

In summary, in the dimming panel according to an embodiment of the present application, the refractive index difference between any two adjacent film layers in the refractive structure of each dimming cell is variable under the action of the electric field applied by the electric field structure in the dimming cell, and the transmittance of the refractive structure is negatively correlated with the refractive index difference between any two adjacent film layers in the refractive structure. Therefore, the refractive index difference between any two adjacent film layers of the refractive structure can be adjusted by adjusting the electric field applied to the refractive structure by the electric field structure in each dimming cell, thereby adjusting the transmittance of the refractive structure in each dimming cell and thereof realizing the dimming function of the dimming panel. That is, the dimming panel can realize the dimming function without a polarizer. Therefore, when the dimming panel forms a display device with a liquid crystal display panel and a backlight module, it is also unnecessary to provide polarizers on two sides of the dimming panel, which reduces the thickness of the display device.

Optionally, in each refractive structure, the number of film layers may be 4, such that the transmittance of the dimming cell can be adjusted in a larger range. However, the number of film layers in each refractive structure may range from 2 to 100, or 10 to 20, which is not limited in the embodiment of the present application.

FIG. 1 takes the refractive structure 121 including four film layers as an example, which is not limited in the embodiment of the present application.

Optionally, at least one of any two adjacent film layers of the refractive structure 121 includes an electro-optic effect material. The electro-optic effect material is a material whose refractive index changes under the action of the electric field. In the embodiments of the present application, the electro-optical effect material may include at least one of dihydrogen phosphate, button acid, potassium dihydrogen phosphate, gallium arsenide, graphene, liquid crystal, and liquid crystal polymer.

In the refractive structure 121, the arrangement of any two adjacent film layers may include the following three types.

In the first arrangement, one of the two adjacent film layers includes the electro-optical effect material, and the other film layer does not include the electro-optical effect material. The material of the other film layer may include at least one non-electro-optic effect material such as polyethylene terephthalate, polyethylene, or polycarbonate.

In the second arrangement, both the two adjacent film layers include the electro-optical effect material. Under the action of the same electric field, the change trend of the refractive index of one of the two film layers is opposite to the other. That is, under the action of the same electric field, the refractive index of one film layer may become larger, and the refractive index of the other film layer may become smaller.

In the third arrangement, both the two adjacent film layers include the electro-optic effect material. Under the action of the same electric field, the refractive indices of the two film layers varies in the same trend, but the amount of change is different. That is, under the action of the same electric field, both the refractive indices of the two film layers can be increased, but the increase in the refractive index of one of the two film layers is different from that of the other film layer.

Optionally, one of the two adjacent film layers in the refractive structure 121 may be a first film layer 1211, and the other may be a second film layer 1212. The first film layer 1211 and the second film layer 1212 may be periodically arranged on the transparent base substrate 11. That is, the refractive structure 121 may be composed of the first film layer 1211 and the second film layer 1212 stacked alternately. In this case, the refractive index difference between any two adjacent film layers in the refractive structure 121 is configured to be changed under the action of the electric field applied by the electric field structure 122 in the dimming cell 12 where the refractive structure 121 is disposed.

Optionally, the number of periods in which the first film layer 1211 and the second film layer 1212 are periodically arranged in the refractive structure 121 may range from 3 to 100, or, 10 to 20, and so on.

Optionally, the thickness of the film layer in the refractive structure 121 may range from 10 nm to 1000 nm or 5 nm to 200 nm. For example, the thickness of each film layer may be 50 nm or 7 nm.

Optionally, in each dimming cell 12, any two adjacent film layers in the refractive structure 121 may be configured such that under the action of the electric field applied by the electric field structure 122 in the dimming cell 12, the refractive index difference between any two adjacent film layers is positively correlated with the intensity of the electric field. The refractive index difference being positively correlated with the intensity of the electric field means that the refractive index difference increases as the intensity of the electric field increases, or the refractive index difference decreases as the intensity of the electric field decreases. In addition, the refractive index difference between any two adjacent film layers may also be negatively correlated with the intensity of the electric field applied by the electric field structure, which is not limited in the embodiments of the present application.

In such a configuration, the refractive index difference between any two adjacent film layers in the refractive structure 121 of the dimming cell 12 can be set smaller, such that when no electric field is applied to the refractive structure 121 in the dimming cell 12, the transmittance of the refractive structure 121 is large. That is, more light is transmittable through the refractive structure 121 without applying the electric field to the refractive structure 121, which reduces the energy consumption of the dimming cell. Optionally, in each dimming cell 12, any two adjacent film layers in the refractive structure 121 may also be configured such that the refractive index difference between any two adjacent film layers is negatively correlated with the intensity of the electric field under the action of the electric field applied by the electric field structure 122 in the dimming cell 12, which is not limited in the embodiments of the present application. It should be noted that the refractive index difference being negatively correlated with the intensity of the electric field means that the refractive index difference decreases as the intensity of the electric field increases, or that the refractive index difference increases as the intensity of the electric field decreases.

Optionally, the transmittance of each dimming cell may be greater than 0% and less than 100%. In this case, any two adjacent film layers in the refractive structure 121 are configured such that under the action of the electric field applied by the electric field structure 122 of the dimming cell 12 where the refractive structure 121 is disposed, and on the premise that the refractive index difference between any two adjacent film layers is positively correlated with the intensity of the electric field, the transmittance of the refractive structure may be less than and close to 100% when the electric field structure 122 does not apply the electric field to the refractive structure 121. Any two adjacent film layers in the refractive structure 121 are configured such that under the action of the electric field applied by the electric field structure 122 of the dimming cell 12 where the refractive structure 121 is disposed, and on the premise that the refractive index difference between any two adjacent film layers is negatively correlated with the intensity of the electric field, the transmittance of the refractive structure can be greater than and close to 0%.

Optionally, the plurality of dimming cells in the dimming panel may include at least one dimming cell group. Each dimming cell group includes at least one dimming cell. The at least one dimming cell group corresponds to at least one colored light respectively. In the dimming cell of any one of the at least one dimming cell group, the refractive index difference between any two adjacent film layers in the refractive structure with respect to the colored light corresponding to any dimming cell group is variable under the action of the electric field applied by the electric field structure. With such a structure, in a certain dimming cell group, after the electric field structure applies the electric field to the refractive structure, the transmittance of the refractive structure for the corresponding colored light will change. In this way, it is convenient for the dimming panel to adjust the transmittance of colored light of a certain color through the dimming cell.

Optionally, the plurality of dimming cells in the dimming panel includes three dimming cell groups. The three dimming cell groups include a first dimming cell group corresponding to first colored light (the first colored light may be red light), a second dimming cell group corresponding to second colored light (the second colored light may be green light), and a third dimming cell group corresponding to third colored light (the third colored light may be blue light).

Figure 2:
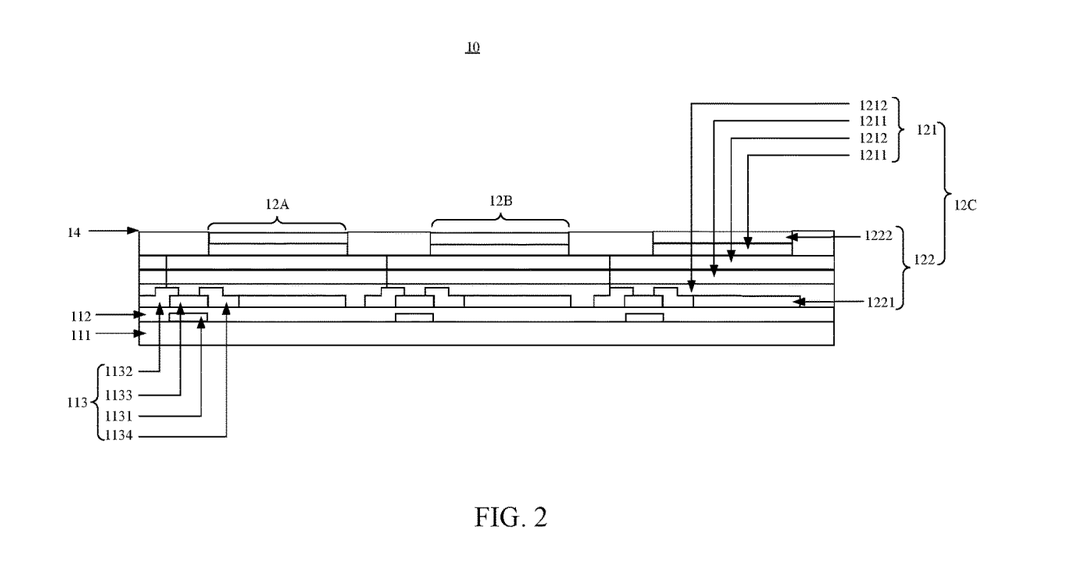
FIG. 2 is a schematic structural diagram of another dimming panel according to an embodiment of the present application.

Exemplarily, FIG. 2 is a schematic structural diagram of another dimming panel according to an embodiment of the present application. The first dimming cell group may include at least one first dimming cell 12A. The second dimming cell group includes at least one second dimming cell 12B. The third dimming cell group may include at least one third dimming cell 12C.

In any first dimming cell 12A in the first dimming cell group, the refractive index difference for a first colored light between any two adjacent film layers in the refractive structure 121 is configured to be changed under the action of the electric field applied by the electric field structure 122 in the first dimming cell 12A. In any second dimming cell 12B in the second dimming cell group, the refractive index difference for a second colored light between any two adjacent film layers in the refractive structure 121 is configured to be changed under the action of the electric field applied by the electric field structure 122 in the second dimming cell 12B. In any third dimming cell 12C in the third dimming cell group, the refractive index difference for a third colored light between any two adjacent film layers in the refractive structure 121 is configured to be changed under the action of the electric field applied by the electric field structure 122 in the third dimming cell 12C.

FIG. 2 takes the plurality of dimming cells in the dimming panel 10 including one first dimming cell 12A, one second dimming cell 12B, and one third dimming cell 12C as an example. However, the plurality of dimming cells may further include other number (such as hundreds or thousands) of first dimming cells 12A, other number (such as hundreds or thousands) of second dimming cells 12B, and other number (such as hundreds or thousands) of third dimming cells 12C, which is not limited in the embodiment of the present application.

Optionally, the transparent base substrate is provided with a plurality of pixel areas. Each of the pixel areas has at least one dimming cell in the first dimming cell group, at least one dimming cell in the second dimming cell group, and at least one dimming cell in the third dimming cell group. In this way, the three dimming cells in each pixel area can form a structure similar to a pixel cell, so as to realize the display function.

In the embodiment of the present application, each electric field structure in the dimming panel may include a first electrode and a second electrode. In each dimming cell, the first electrode and the second electrode may have a plurality of arrangements. The following describes two arrangements among the plurality of arrangements.

In the first arrangement, with continued reference to FIG. 2, in each dimming cell 12 in the dimming panel 10, the first electrode 1221 and the second electrode 1222 are disposed on two sides of the refractive structure 121.

Figure 3:
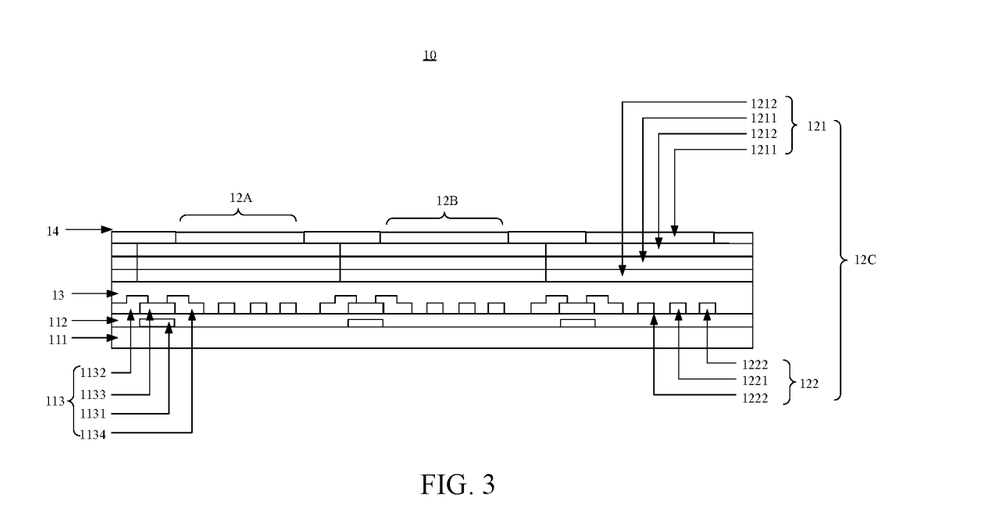
FIG. 3 is a schematic structural diagram of another dimming panel according to an embodiment of the present application.
Figure 4:
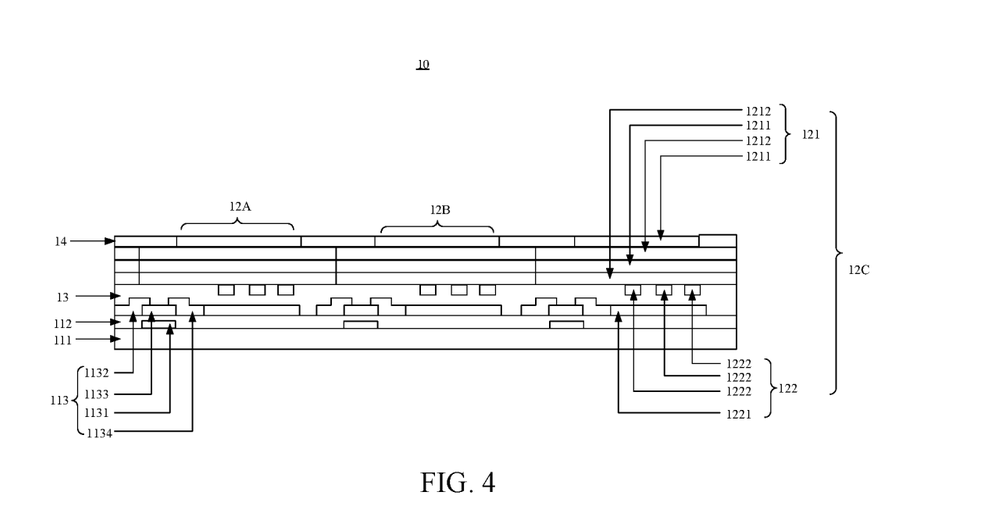
FIG. 4 is a schematic structural diagram of yet another dimming panel according to an embodiment of the present application.

In the second arrangement, as shown in FIGS. 3 and 4, in each dimming cell 12 in the dimming panel 10, the first electrode 1221 and the second electrode 1222 are disposed on the same side of the refractive structure 121. In FIG. 3, the first electrode 1221 and the second electrode 1222 in each dimming cell 12 are disposed on the same layer. In FIG. 4, the first electrode 1221 and the second electrode 1222 in each dimming cell 12 are disposed on different layers.

Optionally, the transparent base substrate in the dimming panel 10 may be a first array substrate. The transparent base substrate may include a first base 111, a first gate insulation layer 112, and a plurality of first thin-film transistors 113. Each of the first thin-film transistors 113 may include a first gate 1131, a first source 1132, a first active layer 1133, and a first drain 1134. The plurality of dimming cells corresponds to the plurality of first thin-film transistors 113 respectively. The first electrode 1221 in the electric field structure 122 in each dimming cell is electrically connected to the first drain 1134 of the first thin-film transistor 113 corresponding to the dimming cell.

As shown in FIG. 2, when the arrangement of the first electrode and the second electrode in each dimming cell is the first arrangement, the dimming panel 10 does not include a planarization layer, and the refractive structure 121 in each dimming cell 12 may be in contact with the transparent base substrate 11.

As shown in FIGS. 3 and 4, when the arrangement of the first electrode and the second electrode in each dimming cell is the first arrangement, the dimming panel 10 may further include a planarization layer 13. As shown in FIG. 3, when the first electrode 1221 and the second electrode 1222 in each dimming cell 12 are disposed on the same layer, both the first electrode 1221 and the second electrode 1222 may be disposed between the transparent base substrate and the refractive structure 121, and the planarization layer 13 may be disposed between the electric field structure 122 and the refractive structure 121. As shown in FIG. 4, when the first electrode 1221 and the second electrode 1222 in each dimming cell 12 are disposed on different layers, both the first electrode 1221 and the second electrode 1222 may be disposed between the transparent base substrate 11 and the refractive structure 121, the planarization layer 13 may be disposed between the first electrode 1221 and the second electrode 1222, and the refractive structure 121 in each dimming cell 12 may be disposed on a side, distal from the planarization layer 13, of the second electrode 1222.

FIG. 3 takes the electric field structure 122 in each dimming cell 12 including one first electrode 1221 and two second electrodes 1222 as an example. FIG. 4 takes the electric field structure 122 in each dimming cell 12 including one first electrode 1221 and three second electrodes 1222 as an example. FIG. 2 takes the electric field structure 122 in each dimming cell including one first electrode 1221 and one second electrode 1222 as an example. Optionally, the electric field structure 122 in each dimming cell 12 may further include other number (such as two) of first electrodes 1221 and other number (such as four) of second electrodes 1222, which is not limited in the embodiment of the present application.

With continued reference to FIG. 2 to FIG. 4, the dimming panel 10 may further include a first black matrix 14. The first black matrix 14 may be configured to separate any two adjacent refractive structures 121 at an end, distal from the transparent base substrate, of the refractive structure 121 11. In this way, light leakage can be avoided at a side, distal from the transparent base substrate 11, of each refractive structure 121.

Figure 5:
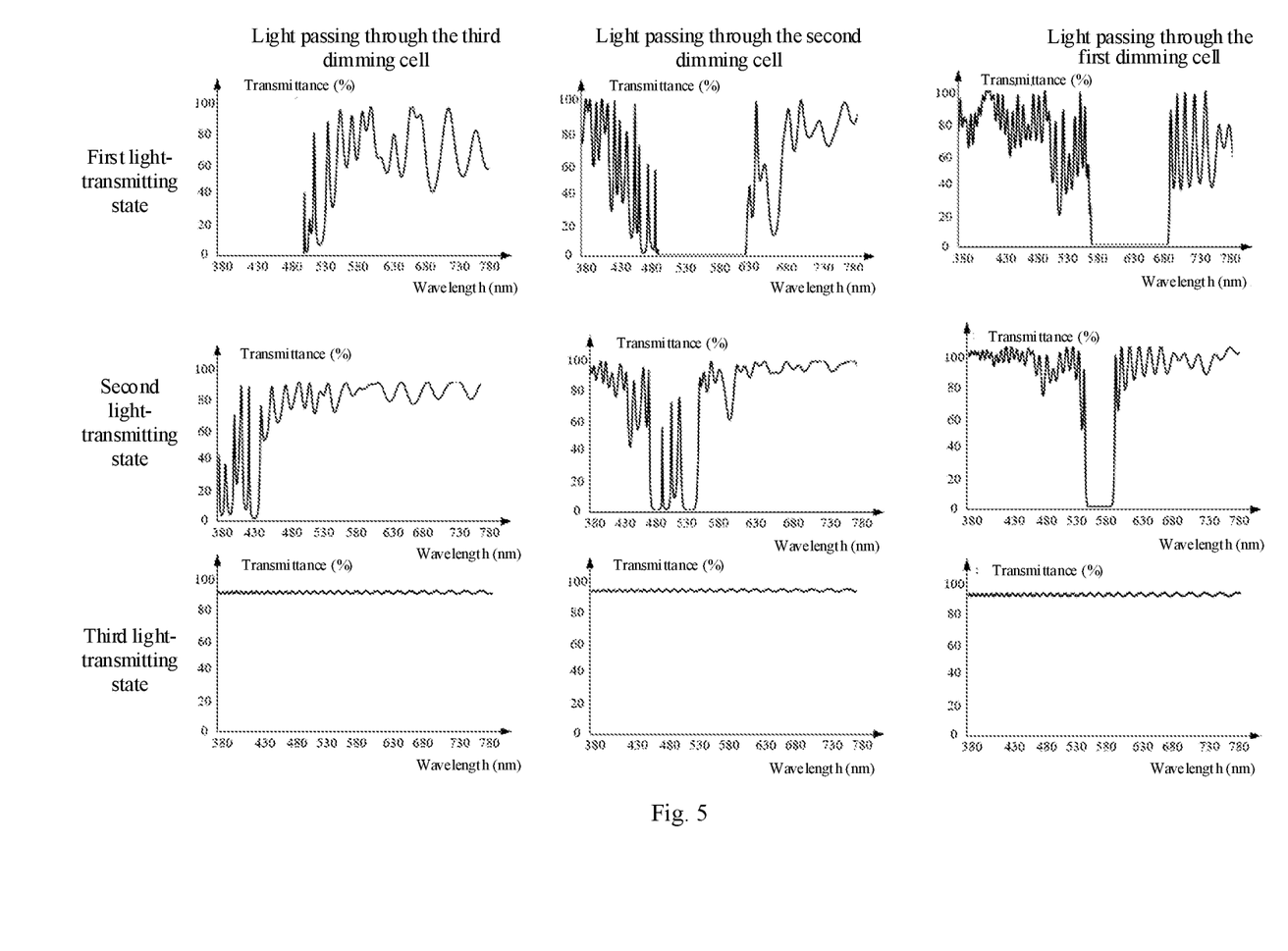
FIG. 5 shows curves of the wavelength and transmittance of light passing through the refractive structure in the dimming cell in various light-transmitting states.

FIG. 5 shows curves of the wavelength and transmittance of light passing through the refractive structure in the dimming cell in various light-transmitting states, where the x-coordinate represents the wavelength of light, and the y-coordinate represents the transmittance. The three rows in the row direction indicate from top to bottom: curves of the wavelength and transmittance in a first light-transmitting state, a second light-transmitting state, and a third light-transmitting state. The light transmission extents of the first light-transmitting state, the second light-transmitting state, and the third light-transmitting state increase in sequence. The three columns in the column direction indicate from right to left: curves of the wavelength and transmittance of the light passing through the first dimming cell, the light passing through the second dimming cell, and the light passing through the third dimming cell.

When the first dimming cell is in the first light-transmitting state, for light passing through the refractive structure in the first dimming cell, the first dimming cell has a transmittance close to 0% for light in a wavelength range from 580 nm to 680 nm (including part of light in the wavelength range where red light is disposed), and the first dimming cell has a transmittance significantly greater than 0% for light in other wavelength ranges. When the first dimming cell is in the second light-transmitting state, for light passing through the refractive structure in the first dimming cell, the first dimming cell has a transmittance close to 0% for light in a wavelength range from 550 nm to 580 nm (including part of light in the wavelength range where red light is disposed), and the first dimming cell has a transmittance significantly greater than 0% for light in other wavelength ranges. When the first dimming cell is in the third light-transmitting state, for light passing through the refractive structure in the first dimming cell, the first dimming cell has a transmittance about 95% for light in a wavelength range from 380 nm to 780 nm (that is, all visible light).

When the second dimming cell is in the first light-transmitting state, for light passing through the refractive structure in the second dimming cell, the second dimming cell has a transmittance close to 0% for light in a wavelength range from 480 nm to 630 nm (including part of light in the wavelength range where green light is disposed), and the second dimming cell has a transmittance significantly greater than 0% for light in other wavelength ranges. When the second dimming cell is in the second light-transmitting state, for light passing through the refractive structure in the second dimming cell, the second dimming cell has a transmittance close to 0% for part of light in a wavelength range from 480 nm to 530 nm (including part of light in the wavelength range where green light is disposed), and the second dimming cell has a transmittance significantly greater than 0% for light in other wavelength ranges and another part of light in a wavelength range from 480 nm to 530 nm. When the second dimming cell is in the third light-transmitting state, for light passing through the refractive structure in the second dimming cell, the second dimming cell has a transmittance about 95% for light in a wavelength range from 380 nm to 780 nm (that is, all visible light).

When the third dimming cell is in the first light-transmitting state, for light passing through the refractive structure in the third dimming cell, the third dimming cell has a transmittance close to 0% for light in a wavelength range from 380 nm to 480 nm (including part of light in the wavelength range where blue light is disposed), and the third dimming cell has a transmittance significantly greater than 0% for light in other wavelength ranges. When the third dimming cell is in the second light-transmitting state, for light passing through the refractive structure in the third dimming cell, the third dimming cell has a transmittance close to 0% for part of light in a wavelength range from 380 nm to 430 nm (including part of light in the wavelength range where blue light is disposed), and the third dimming cell has a transmittance significantly greater than 0% for light in other wavelength ranges and another part of light in a wavelength range from 380 nm to 430 nm. When the third dimming cell is in the third light-transmitting state, for light passing through the refractive structure in the third dimming cell, the third dimming cell has a transmittance about 95% for light in a wavelength range from 380 nm to 780 nm (that is, all visible light).

Optionally, the first light-transmitting state may be a state when the light transmission degree of the dimming cell is at a minimum degree, the second light-transmitting state may be a state where the light transmission degree of the dimming cell is between the minimum and maximum degree, and the third light-transmitting state may be a state when the dimming cell is at a maximum degree.

When the electric field structure in the dimming cell does not apply the electric field to the refractive structure, the dimming cell may be in the first light-transmitting state. In this case, the intensity of the electric field applied to the refractive structure by the electric field structure when the dimming cell is in the second light-transmitting state is less than that when the dimming cell is in the third light-transmitting state. In addition, when the electric field structure in the dimming cell does not apply an electric field to the refractive structure, the dimming cell may also be in the third light-transmitting state. In this case, the intensity of the electric field applied to the refractive structure by the electric field structure when the dimming cell is in the second light-transmitting state is less than that when the dimming cell is in the first light-transmitting state.

In summary, in the dimming panel according to the embodiments of the present application, the refractive index difference between any two adjacent film layers in the refractive structure of each dimming cell is variable under the action of the electric field applied by the electric field structure in the dimming cell, and the transmittance of the refractive structure is negatively correlated with the refractive index difference between any two adjacent film layers in the refractive structure. Therefore, the refractive index difference between any two adjacent film layers of the refractive structure can be adjusted by adjusting the electric field applied to the refractive structure by the electric field structure in each dimming cell, thereby adjusting the transmittance of the refractive structure in each dimming cell and thereof realizing the dimming function of the dimming panel. That is, the dimming panel can realize the dimming function without a polarizer. Therefore, when the dimming panel forms a display device with a liquid crystal display panel and a backlight module, it is also unnecessary to provide polarizers on two sides of the dimming panel, which reduces the thickness of the display device.

Figure 6:
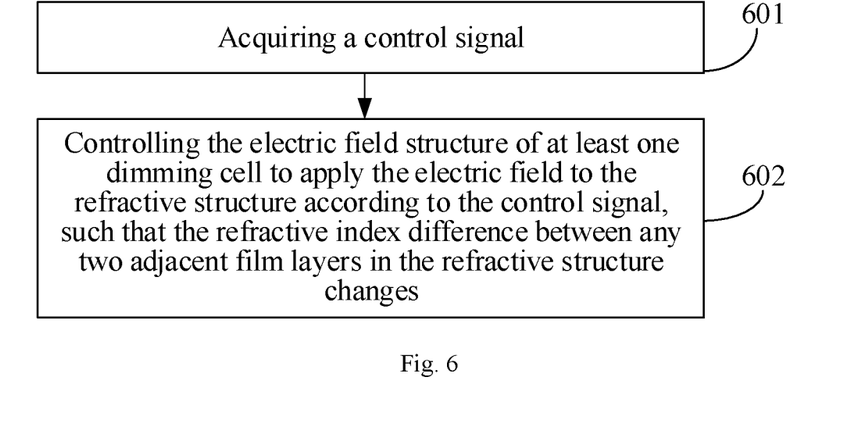
FIG. 6 is a flowchart of a control method of a dimming panel according to an embodiment of the present application.

FIG. 6 is a flowchart of a control method of a dimming panel according to an embodiment of the present application. The control method of the dimming panel may be used in a control component of any one of the above dimming panels. The control component may be incorporated in the dimming panel and may also be arranged outside the dimming panel. The control method of the dimming panel may include the following steps.

In step 601, a control component acquires a control signal.

The control component may acquire a control signal from an external source device. The control signal may be used to instruct the electric field applied by the electric field structure in each dimming cell in the dimming panel, thereby controlling the transmittance of each dimming cell.

In step 602, the electric field structure in at least one of dimming cells is controlled according to the control signal to apply an electric field to the refractive structure, such that the refractive index difference between any two adjacent film layers in the refractive structure changes.

The control component can control the electric field structure to apply the electric field to the refractive structure in the dimming cell such that the refractive index difference between any two adjacent film layers in the refractive structure changes. Therefore, the transmittance of the dimming cell changes to realize the dimming function of the dimming panel.

Figure 7:
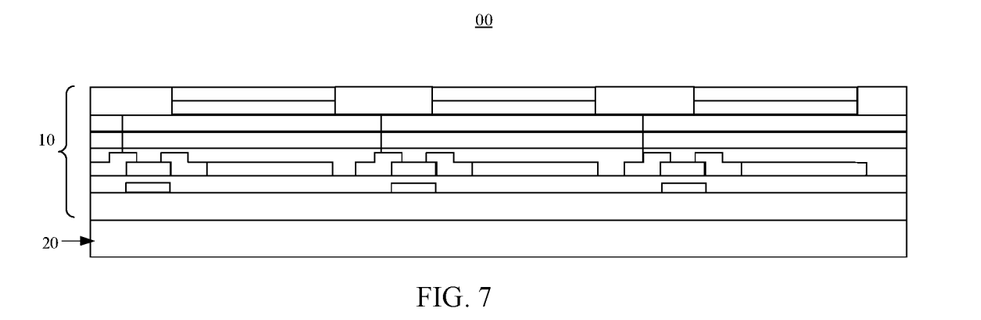
FIG. 7 is a schematic structural diagram of a display device according to an embodiment of the present application.

FIG. 7 is a schematic structural diagram of a display device according to an embodiment of the present application. The display device 00 may include a backlight module 20 and any of the above dimming panels 10 (FIG. 7 only takes the dimming panel 10 including the dimming panel 10 shown in FIG. 2 as an example). The dimming panel 10 is disposed on a light-emitting side of the backlight module 20.

Figure 8:
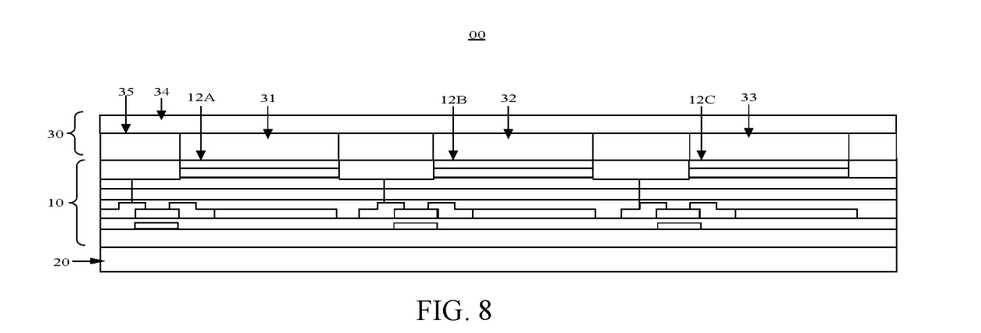
FIG. 8 is a schematic structural diagram of another display device according to an embodiment of the present application.

FIG. 8 is a schematic structural diagram of another display device according to an embodiment of the present application. The display device 00 may further include a color filter substrate 30. The color filter substrate 30 is disposed on a side, distal from the backlight module 20, of the dimming panel 10.

Optionally, the color filter substrate 30 may include a plurality of color resist blocks. The plurality of color resist blocks corresponds to the plurality of dimming cells of the dimming panel 10 respectively. An orthographic projection of each color resist block on the transparent base substrate is disposed within an orthographic projection of the corresponding dimming cell on the transparent base substrate. In this case, each dimming cell may be used to adjust the brightness of the area where one sub-pixel is disposed.

In the embodiment of the present application, each dimming cell corresponding to one color resist block is taken as an example for description. Optionally, each dimming cell may also correspond to a plurality of color resist blocks. That is, orthographic projections of the plurality of color resist blocks on the transparent base substrate are disposed within the orthographic projection of the dimming cell on the transparent base substrate. In this case, each dimming cell may be used to adjust the brightness of the area where a plurality of sub-pixels is disposed.

Optionally, the plurality of dimming cells include at least one dimming cell group. Each dimming cell group includes at least one dimming cell. The at least one dimming cell group corresponds to at least one colored light respectively. In a dimming cell of any of the at least one dimming cell group, the refractive index difference between any two adjacent film layers in the refractive structure with respect to the colored light corresponding to the any dimming cell group is variable under the action of the electric field applied by the electric field structure. The colored light corresponding to each dimming cell group is transmittable through the color resist block corresponding to the dimming cell in each dimming cell group. In this way, on the premise that a certain dimming cell adjusts the transmittance of the corresponding colored light, the color resist block corresponding to the dimming cell can only transmit the colored light corresponding to the dimming cell, thereby realizing the precise adjustment of certain colored light.

Optionally, a red-light dimming cell group in the dimming panel 10 in the display device 00 may include at least one first dimming cell 12A. The plurality of color resist blocks may include at least one red color resist block 31. An orthographic projection of the at least one red color resist block 31 on the transparent base substrate is disposed within an orthographic projection of the at least one first dimming cell 12A on the transparent base substrate respectively.

Optionally, a green light dimming cell group may include at least one second dimming cell 12B. The plurality of color resist blocks may further include at least one green color resist block 32. An orthographic projection of the at least one green color resist block 32 on the transparent base substrate is disposed within an orthographic projection of the at least one second dimming cell 12B on the transparent base substrate respectively.

Optionally, a blue light dimming cell group may further include at least one third dimming cell 12C. The plurality of color resist blocks may further include at least one blue color resist block 33. An orthographic projection of the at least one blue color resist block 33 on the transparent base substrate is disposed within an orthographic projection of the at least one third dimming cell 12C on the transparent base substrate respectively.

Optionally, the color filter substrate 30 may further include a second substrate 34 and a second black matrix 35. The second black matrix 35 is configured to separate any two adjacent color resist blocks in the color filter substrate 30.

Figure 9:
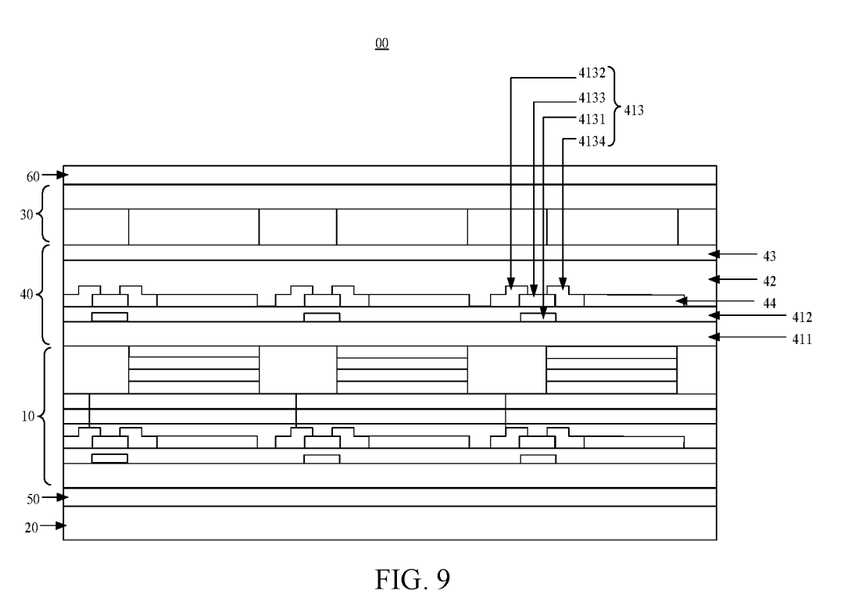
FIG. 9 is a schematic structural diagram of yet another display device according to an embodiment of the present application.

FIG. 9 is a schematic structural diagram of yet another display device according to an embodiment of the present application. The display device 00 may further include a liquid crystal display panel 40, a first polarization plate 50, and a second polarization plate 60. The liquid crystal display panel 40 is disposed between the first polarization plate 50 and the second polarization plate 60. In this way, after the dimming cell of the dimming panel 10 adjusts the transmittance of the light emitted by the backlight module 20, the liquid crystal display panel 40 may adjust the transmittance of the light emitted from the dimming cell again, such that the display device 00 can emit light of more kinds of brightness to improve the contrast of the display device 00.

If the upper limit of the transmittance of the dimming panel 10 is b (b is less than 100%), and the lower limit of the transmittance is a (a is greater than 0%), then the contrast degree of the liquid crystal display panel 40 improved by the dimming panel 10 is positively correlated with b/a. That is, the greater b/a, the greater the contrast degree of the liquid crystal display panel 40 improved by the dimming panel 10. The smaller b/a, the smaller the contrast degree of the liquid crystal display panel 40 improved by the dimmer panel 10. According to the design requirements for the contrast degree of the display device, the dimming panel of the display device according to the embodiment of the present application may be provided with a corresponding film layer structure, such that the quotient of the upper limit and the lower limit of the transmittance of the dimming panel reaches the design specified value, and thus the contrast of the display device can meet the design requirements.

FIG. 9 takes the dimming panel 10 being disposed between the liquid crystal display panel 40 and the first polarization plate 50 as an example. Optionally, the dimming panel 10, the liquid crystal display panel 40, and the first polarization plate 50 may also have other positional relationships. For example, the dimming panel may be disposed on a side, distal from the liquid crystal display panel 40, of the first polarization plate 50, which is not limited in the embodiments of the present application.

Alternatively, the liquid crystal display panel 40 may include a second array substrate, a liquid crystal layer 42, a common electrode 43, and a plurality of pixel electrodes 44. The second array substrate may include a third base 411, a second gate insulation layer 412, and a plurality of second thin-film transistors 413. Each second thin-film transistor 413 may include a second gate 4131, a second source 4132, a second active layer 4133 and a second drain 4134. It should be noted that the plurality of pixel electrodes 44 correspond to the plurality of second thin-film transistors 413 respectively, and each pixel electrode 44 is electrically connected to the second drain 4134 in the corresponding second thin-film transistor 413.

Optionally, orthographic projections of the plurality of pixel electrodes 44 in the liquid crystal display panel 40 on the transparent base substrate in the dimming panel 10 may be disposed within orthographic projections of the plurality of dimming cells in the dimming panel 10 on the transparent base substrate respectively.

FIG. 9 takes the color filter substrate 30 being disposed on a side of the liquid crystal display panel 40 distal from the dimming panel 10 as an example. Optionally, the color filter substrate 30, the liquid crystal display panel 40, and the dimming panel 10 may also have other position relationships. For example, the color filter substrate may also be disposed between the liquid crystal display panel 40 and the dimming panel 10, which is not limited in the embodiments of the present application.

In addition, FIG. 9 takes the common electrode 43 and the pixel electrode 44 in the liquid crystal display panel 40 being disposed on two sides of the liquid crystal layer 42 as an example. Optionally, the common electrode and the pixel electrode in the liquid crystal display panel may also be disposed on the same side of the liquid crystal layer. On the premise that the common electrode and the pixel electrode are disposed on the same side of the liquid crystal layer, the common electrode and the pixel electrode may be disposed on the same layer (this structure may be an In-Plane Switching (IPS) display device) or different layers (this structure may be a Fringe Field Switching (FFS) display device), which is not limited in the embodiments of the present application. For the specific arrangement of the common electrode and the pixel electrode, reference may be made to the arrangement of the first electrode and the second electrode in the foregoing embodiments, which will not be repeated in the embodiments of the present application.

In addition, FIG. 9 takes the transparent base substrate 11 in the dimming panel 10 being disposed on a side, distal from the liquid crystal display panel 40, of the plurality of dimming cells 12 in the display device 00 as an example. Optionally, the transparent base substrate 11 in the dimming panel 10 may also be disposed on a side, close to the liquid crystal display panel 40, of the plurality of dimming cells 12, which is not limited in the embodiment of the present application.

In addition, FIG. 9 takes a fact that on the light-emitting side of the backlight module 20 in the display device 00, the dimming panel 10 and the liquid crystal display panel 40 are sequentially arranged in a direction distal from the backlight module 20. Optionally, on the light-emitting side of the backlight module 20 in the display device 00, the liquid crystal display panel 40 and the dimming panel 20 are arranged in sequence in a direction distal from the backlight module 20, which is not limited in the embodiments of the present application.

In addition, FIG. 9 takes a fact that the dimming panel 10 and the liquid crystal display panel 40 in the display device 00 share the second base 40 as an example. Optionally, the dimming panel 10 and the liquid crystal display panel 40 may not share the base 40. In this way, the dimming panel 10 may be provided with a third base on a side distal from the backlight module 20. The third base may be disposed on a side, close to the dimming panel 10, of the second substrates 40 and are in contact with the dimming panel 10, which is not limited in the embodiment of the present application.

Figure 10:
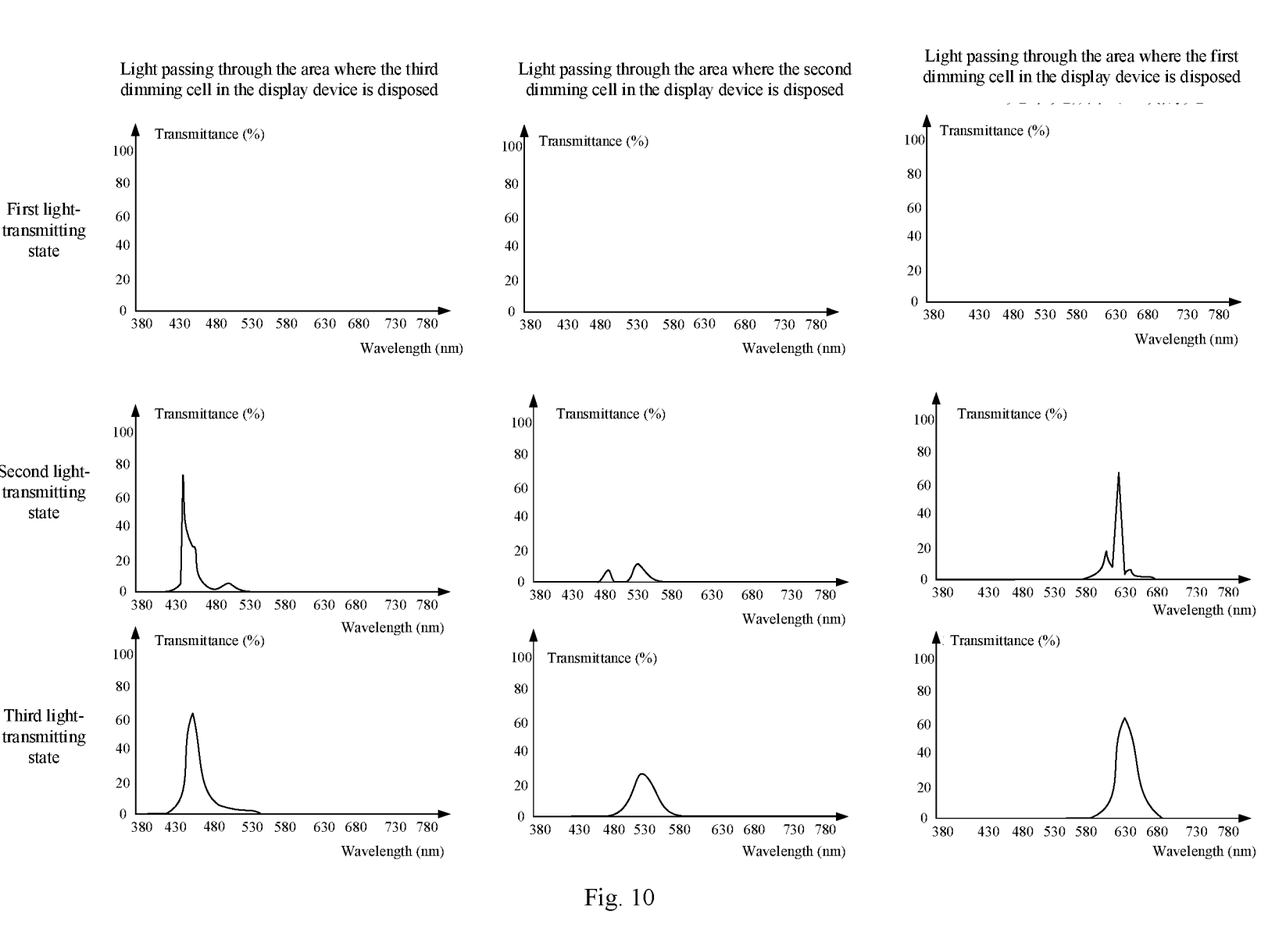
FIG. 10 shows a curve of the wavelength and transmittance of light emitted from the display device.

FIG. 10 shows curves of the wavelength and transmittance of light emitted from the display device, and FIG. 10 shows curves of the wavelength and transmittance of the light emitted from the display device in a variety of light-transmitting states of the dimming cell in the display device. The three rows in the row direction from top to bottom are: curves of the wavelength and transmittance of the first light-transmitting state, the second light-transmitting state, and the third light-transmitting state. The light transmission degrees of the first light-transmitting state, the second light-transmitting state, and the third light-transmitting state increase in sequence. The three columns in the column direction from right to left are: curves of the wavelength and transmittance of light transmitting through the area where the first dimming cell in the display device is disposed, light transmitting through the area where the second dimming cell in the display device is disposed, and light transmitting through the area where the third dimming cell in the display device is disposed.

When the first dimming cell is in the first light-transmitting state, for light passing through the area where the first dimming cell in the display device is disposed, the display device has a transmittance greater than and close to 0% for light in a wavelength range from 380 nm to 780 nm. When the first dimming cell is in the second light-transmitting state, for light passing through the area where the first dimming cell in the display device is disposed, the transmittance of the display device for part of light in a wavelength range from 580 nm to 680 nm can be increased first and then decreased, and the transmittance for light in other wavelength ranges and another part of light in a wavelength range from 580 nm to 680 nm can be greater than and close to 0%. When the first dimming cell is in the third light-transmitting state, for light passing through the area where the first dimming cell in the display device is disposed, the transmittance of the display device for light in a wavelength range from 580 nm to 680 nm can be increased first and then decreased, and the transmittance for light in other wavelength ranges can be greater than and close to 0%.

When the second dimming cell is in the first light-transmitting state, for light passing through the area where the second dimming cell in the display device is disposed, the display device has a transmittance greater than and close to 0% for light in a wavelength range from 380 nm to 780 nm. When the second dimming cell is in the second light-transmitting state, for light passing through the area where the second dimming cell in the display device is disposed, the transmittance of the display device for part of light in a wavelength range from 480 nm to 580 nm can be increased first and then decreased, and the transmittance for light in other wavelength ranges and another part of light in a wavelength range from 480 nm to 580 nm can be greater than and close to 0%. When the second dimming cell is in the third light-transmitting state, for light passing through the area where the second dimming cell in the display device is disposed, the transmittance of the display device for light in a wavelength range from 480 nm to 580 nm can be increased first and then decreased, and the transmittance for light in other wavelength ranges can be greater than and close to 0%.

When the third dimming cell is in the first light-transmitting state, for light passing through the area where the third dimming cell in the display device is disposed, the display device has a transmittance greater than and close to 0% for light in a wavelength range from 380 nm to 780 nm. When the third dimming cell is in the second light-transmitting state, for light passing through the area where the third dimming cell in the display device is disposed, the transmittance of the display device for part of light in a wavelength range from 430 nm to 530 nm can be increased first and then decreased, and the transmittance for light in other wavelength ranges and another part of light in a wavelength range from 430 nm to 530 nm can be greater than and close to 0%. When the third dimming cell is in the third light-transmitting state, for light passing through the area where the third dimming cell in the display device is disposed, the transmittance of the display device for light in a wavelength range from 430 nm to 530 nm can be increased first and then decreased, and the transmittance for light in other wavelength ranges can be greater than and close to 0%.

In summary, in the display device according to the embodiment of the present application, the refractive index difference between any two adjacent film layers in the refractive structure of each dimming cell is variable under the action of the electric field applied by the electric field structure in the dimming cell, and the transmittance of the refractive structure is negatively correlated with the refractive index difference between any two adjacent film layers in the refractive structure. Therefore, the refractive index difference between any two adjacent film layers of the refractive structure can be adjusted by adjusting the electric field applied to the refractive structure by the electric field structure in each dimming cell, thereby adjusting the transmittance of the refractive structure in each dimming cell and thereof realizing the dimming function of the dimming panel. That is, the dimming panel can realize the dimming function without a polarizer. Therefore, when the dimming panel forms a display device with a liquid crystal display panel and a backlight module, it is also unnecessary to provide polarizers on two sides of the dimming panel, which reduces the thickness of the display device.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A dimming panel, comprising a transparent base substrate and a plurality of dimming cells disposed on the transparent base substrate,
wherein each of the dimming cells comprises a refractive structure and an electric field structure disposed outside the refractive structure, and the refractive structure comprises at least two film layers laminated, a refractive index difference between any two adjacent film layers in the at least two film layers being variable under an action of an electric field applied by the electric field structure, and the refractive index difference between any two adjacent film layers being positively correlated with an intensity of the electric field applied by the electric field structure;
the electric field structure comprises a first electrode and a second electrode, both the first electrode and the second electrode being disposed between the transparent base substrate and the refractive structure; and the dimming panel further comprises a planarization layer, the planarization layer is disposed between the electric field structure and the refractive structure in a case that the first electrode and the second electrode are disposed on a same layer, or the planarization layer is disposed between the first electrode and the second electrode in a case that the first electrode and the second electrode are disposed on different layers.

2. The dimming panel according to claim 1, wherein the plurality of dimming cells comprise at least one dimming cell group, each dimming cell group comprising at least one of the dimming cells, and the at least one dimming cell group one-to-one corresponding to at least one colored light; and in the dimming cell of any dimming cell group of the at least one dimming cell group, the refractive index difference between any two adjacent film layers in the refractive structure with respect to the colored light corresponding to the any dimming cell group is variable under the action of the electric field applied by the electric field structure.

3. The dimming panel according to claim 2, wherein the plurality of dimming cells comprise three dimming cell groups comprising a first dimming cell group corresponding to first colored light, a second dimming cell group corresponding to second colored light, and a third dimming cell group corresponding to third colored light.

4. The dimming panel according to claim 3, wherein the transparent base substrate is provided with a plurality of pixel areas, each of the pixel areas comprising at least one dimming cell in the first dimming cell group, at least one dimming cell in the second dimming cell group, and at least one dimming cell in the third dimming cell group.

5. The dimming panel according to claim 1, wherein at least one film layer of any two adjacent film layers in the refractive structure comprises an electro-optic effect material.

6. The dimming panel according to claim 5, wherein the electro-optic effect material comprises at least one of dihydrogen phosphate, button acid, potassium dihydrogen phosphate, gallium arsenide, graphene, liquid crystal, and liquid crystal polymer.

7. The dimming panel according to claim 1, wherein the refractive structure comprises at least four film layers laminated.

8. The dimming panel according to claim 1, wherein the plurality of dimming cells comprise at least one dimming cell group, each dimming cell group comprising at least one of the dimming cells, and the at least one dimming cell group one-to-one corresponding to at least one colored light;

in the dimming cell of any dimming cell group of the at least one dimming cell group, the refractive index difference between any two adjacent film layers in the refractive structure with respect to the colored light corresponding to the any dimming cell group is variable under the action of the electric field applied by the electric field structure;

the plurality of dimming cells comprise three dimming cell groups comprising a first dimming cell group corresponding to first colored light, a second dimming cell group corresponding to second colored light, and a third dimming cell group corresponding to third colored light; and at least one film layer of any two adjacent film layers in the refractive structure comprises an electro-optic effect material.

9. The dimming panel according to claim 1, wherein a thickness of each film layer in the refractive structure ranges from 5 nm to 200 nm.

10. A display device, comprising a backlight module and a dimming panel, wherein the dimming panel is disposed on a light-emitting side of the backlight module, and the dimming panel comprises a transparent base substrate and a plurality of dimming cells disposed on the transparent base substrate;

wherein each of the dimming cells comprises a refractive structure and an electric field structure disposed outside the refractive structure, and the refractive structure comprises at least two film layers laminated, a refractive index difference between any two adjacent film layers in the at least two film layers being variable under an action of an electric field applied by the electric field structure, and the refractive index difference between any two adjacent film layers being positively correlated with an intensity of the electric field applied by the electric field structure;

the electric field structure comprises a first electrode and a second electrode, both the first electrode and the second electrode being disposed between the transparent base substrate and the refractive structure; and the dimming panel further comprises a planarization layer, the planarization layer is disposed between the electric field structure and the refractive structure in a case that the first electrode and the second electrode are disposed on a same layer, or the planarization layer is disposed between the first electrode and the second electrode in a case that the first electrode and the second electrode are disposed on different layers.

11. The display device according to claim 10, further comprising a color filter substrate disposed on a side, distal from the backlight module, of the dimming panel.

12. The display device according to claim 10, wherein the color filter substrate comprises a plurality of color resist blocks one-to-one corresponding to the plurality of dimming cells, an orthographic projection of each of the color resist blocks on the transparent base substrate falling within an orthographic projection of the corresponding dimming cell on the transparent base substrate.

13. The display device according to claim 12, wherein the plurality of dimming cells comprise at least one dimming cell group, each dimming cell group comprising at least one of the dimming cells, and the at least one dimming cell group one-to-one corresponding to at least one colored light;

in the dimming cell of any dimming cell group of the at least one dimming cell group, the refractive index difference between any two adjacent film layers in the refractive structure with respect to the colored light corresponding to the any dimming cell group is variable under the action of the electric field applied by the electric field structure; and the colored light corresponding to each dimming cell group is transmittable through the color resist block corresponding to the dimming cell in each dimming cell group.

14. The display device according to claim 10, further comprising a liquid crystal display panel, a first polarization plate, and a second polarization plate, wherein the liquid crystal display panel is disposed between the first polarization plate and the second polarization plate.

15. The display device according to claim 10, wherein the plurality of dimming cells comprise at least one dimming cell group, each dimming cell group comprising at least one of the dimming cells, and the at least one dimming cell group one-to-one corresponding to at least one colored light; and in the dimming cell of any dimming cell group of the at least one dimming cell group, the refractive index difference between any two adjacent film layers in the refractive structure with respect to the colored light corresponding to the any dimming cell group is variable under the action of the electric field applied by the electric field structure; and the display device further comprises a color filter substrate disposed on a side, distal from the backlight module, of the dimming panel;

the color filter substrate comprises a plurality of color resist blocks one-to-one corresponding to the plurality of dimming cells, an orthographic projection of each of the color resist blocks on the transparent base substrate falling within an orthographic projection of the corresponding dimming cell on the transparent base substrate; and the colored light corresponding to each dimming cell group is transmittable through the color resist block corresponding to the dimming cells in each dimming cell group; and the display device further comprises a liquid crystal display panel, a first polarization plate, and a second polarization plate, the liquid crystal display panel being disposed between the first polarization plate and the second polarization plate.

16. A control method of a dimming panel, applicable to controlling a dimming panel, wherein the dimming panel comprises a transparent base substrate and a plurality of dimming cells disposed on the transparent base substrate; wherein each of the dimming cells comprises a refractive structure and an electric field structure disposed outside the refractive structure, and the refractive structure comprises at least two film layers laminated, a refractive index difference between any two adjacent film layers in the at least two film layers being variable under an action of an electric field applied by the electric field structure and the refractive index difference between any two adjacent film layers being positively correlated with an intensity of the electric field applied by the electric field structure;

the electric field structure comprises a first electrode and a second electrode, both the first electrode and the second electrode being disposed between the transparent base substrate and the refractive structure; and the dimming panel further comprises a planarization layer, the planarization layer is disposed between the electric field structure and the refractive structure in a case that the first electrode and the second electrode are disposed on a same layer, or the planarization layer is disposed between the first electrode and the second electrode in a case that the first electrode and the second electrode are disposed on different layers;

and the method comprises:

acquiring a control signal; and controlling the electric field structure of at least one dimming cell to apply an electric field to the refractive structure according to the control signal, such that the refractive index difference between any two adjacent film layers in the refractive structure is variable.

* * * * *